Patented Feb. 20, 1923.

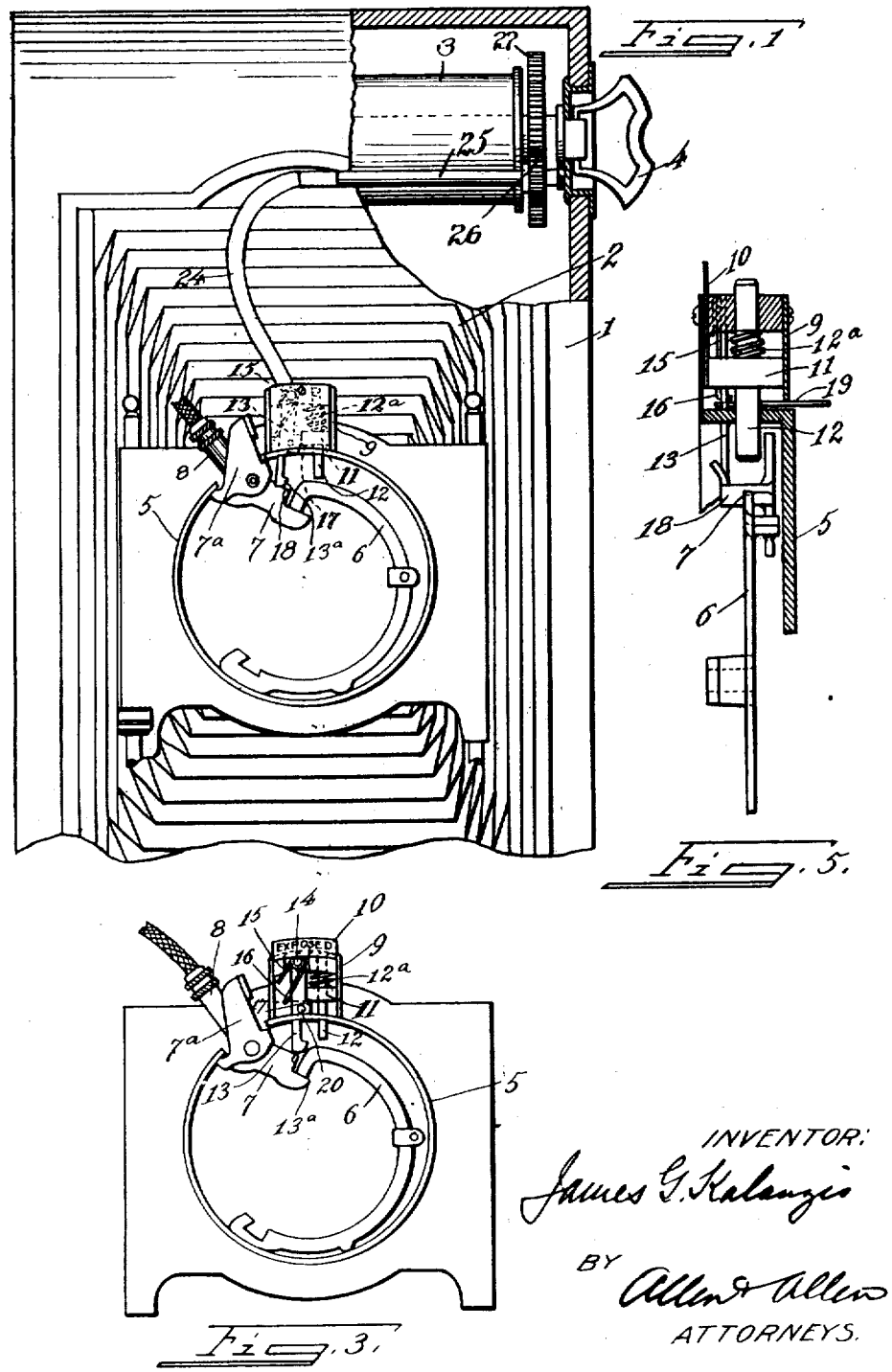

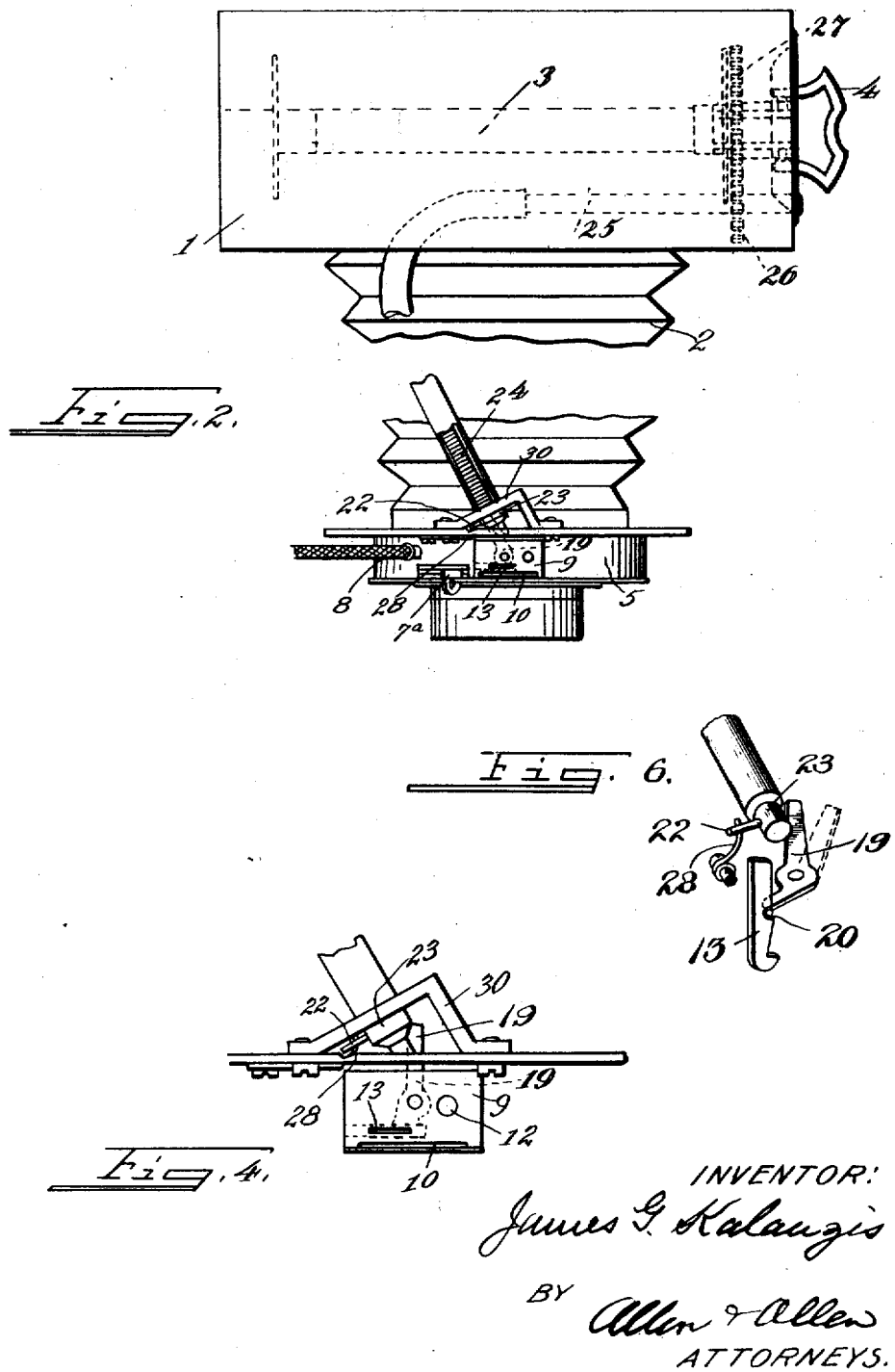

1,446,186

UNITED STATES PATENT OFFICE.

JAMES G. KALANZIS, OF CHATTANOOGA, TENNESSEE.

SHUTTER LOCK FOR CAMERAS.

Application filed September 23, 1921. Serial No. 502,809.

*To all whom it may concern:*

Be it known that I, JAMES G. KALANZIS, a subject of the King of Greece, who has filed his first papers for citizenship in the United States, and a resident of Chattanooga, in the county of Hamilton and State of Tennessee, have invented certain new and useful Improvements in Shutter Locks for Cameras, of which the following is a full, clear, and exact description, reference being had to the accompanying drawings, forming part of this specification.

My invention relates to mechanism for attachment to the shutter mechanism of cameras in which an indicator is employed to indicate when a picture has been taken and a lock is brought into operation to prevent the subsequent operation of the shutter and a double exposure of the sensitized film or plate until the film shifting device is operated.

The object of the invention is, among other things, to provide a simple and effective construction which can be applied to the shutter mechanism of the ordinary camera with a minimum number of openings into the shutter housing whereby the entrance of rays of light behind the shutter is avoided and to insure effective operation of the indicator and lock at all times with the assurance of the prompt and unfailing release of the lock upon the withdrawal of the film or plate which has been already exposed.

My invention has special relation to improvements over the construction disclosed in Letters Patent No. 1,262,657, of April 16, 1918, to T. W. Ford, and it embodies that certain novel construction and arrangement of parts to be hereinafter particularly pointed out and claimed.

I have illustrated my invention in connection with a folding, sensitized roll film camera, but it will be obvious that the invention can be applied to any ordinary camera construction whether film or plate, and in describing the particular details of well known camera parts I do not wish to be understood as confining myself to such details, and many obvious changes can be made in the application of the improvements to the particular camera selected without departing from the spirit of my invention.

In the drawings,

Figure 1 is a front elevation of a portion of a folding camera shewing my improvements, with the shutter mechanism unlocked and ready for operation.

Figure 2 is a top plan view of same with the shutter mechanism locked.

Figure 3 is a front elevation of the improvement applied to the shutter mechanism with the same locked from operation.

Figure 4 is a detail top plan view of parts of the lock and releasing devices.

Figure 5 is a sectional side elevation of the same.

Figure 6 is a perspective view of the tensioning device for the flexible shaft.

The camera casing is indicated at 1 with a bellows 2 connecting the film compartment with the lens and shutter devices.

The exposed sensitized film is wound in a reel 3 turned by finger piece 4.

The shutter housing is indicated at 5 containing a lever 6 actuated by a shutter lever 7 which in turn is operated by a finger piece 7ª or by a pneumatic plunger and flexible tube 8 in the ordinary way to release the shutter and expose the film or plate.

I have made no effort to illustrate the details of the camera construction as they are all well known and any other construction than the one indicated could have been selected.

To apply my invention I provide a small casing 9 which is mounted on top of the shutter housing. In this casing is mounted to slide vertically through a slot in the top of the case, a plate 10, which carries the word "Exposed" or some other signal to indicate, when visible, that an exposure has been made.

The plate is secured to a block or bar 11 which carries a pin or stud 12 which extends upwardly through a hole in the top of the casing 9 with a coiled spring 12ª bearing between the block 11 and the casing 9 so as normally to hold the indicator plate out of sight in the casing. The pin 12 also extends downwardly through an opening in the shutter housing 5 normally into the pathway of the shutter actuating lever 6, so that when the shutter is actuated to expose the film or plate, the pin 12 will be lifted and the indicator plate 10 brought into view either, as illustrated, over the top of the casing, or through a window opening in the case.

When the plate 10 has thus been lifted it is caught by a latch 13 pivoted on a transverse pivot 14 in a groove in the top of the case with a coiled spring 15 on the pivot pin, one end bearing against the top and the other end 16 hooked around the latch tending to swing the latch laterally so that when the block 11 is raised the shoulder 17 in the latch will engage under the edge of the block to hold the indicator plate in the exposed position.

The lower end of the latch which is curved at 13ª to prevent catching projects over an extension 18 on the shutter lever 7 when the latch has engaged the block 11, so that the shutter lever can not be actuated when the latch is in vertical position and no shutter operation can take place until the latch is released and swung back to its normal position. To release the latch I pivot a releasing lever 19 in the bottom of the casing to swing horizontally, and one end of this lever engages in a recess 20 in the latch 13. The other end of this lever 19 extends outside of the casing into the pathway of an arm 22 projecting radially from a rotatable member 23 which is mounted in a bracket 30 in the end of a flexible shaft 24. This flexible shaft is coupled to a shaft 25, which carries a gear 26 in mesh with the gear 27 on the film reel 3. The rotation of the film reel 3 by the finger piece 4 will turn the flexible shaft 24 and the member 23 to bring the arm 22 into contact with the lever 19, to release the latch 13.

In the rotation of the flexible shaft, the member 23 may stop in any position and the action of the flexible shaft may not always be sufficient of itself to throw the lever 19 and therefore to increase the efficiency and insure positive action I secure a spring rod or wire 28 to the casing with the free end of this wire extending into the pathway of the arm 22.

When upon rotating the member 23 the radial arm comes in contact with the wire 28 this will stop the rotation and the tension in the flexible shaft will be increased until the tension is sufficiently strong for the arm 22 to snap past the retarding wire and to strike the lever 19 with considerable force to insure positively the swinging of the arm 19 and the releasing of the latch 13.

The construction of releasing mechanism and the means whereby I increase the tension of the flexible shaft form two of the more important parts of my invention.

Heretofore, as in the construction shown in the Ford patent heretofore referred to, the holding latch is released directly by a cam member for the application of which it is necessary to form a special opening in the shutter housing through which with any wear of the parts light is liable to enter behind the shutter and moreover as the parts necessarily must be small the cam member is not always accurate in its operation. This objection is obviated by the employment of the releasing lever 19. Again where reliance is placed on the torque of the flexible shaft alone to rotate the cam as in Ford, the power exerted by the twisting shaft is liable not to be sufficient to effect the release. The interposition of the spring piece 28 to increase the tension or to wind up, as it were, the flexible shaft insures positive and uniform action.

When the latch 13 has been released the coiled spring 12ª at once depresses the block 11 and the latch 13 is held out of the pathway of the shutter lever and the shutter is again free to operate.

It will be evident from the foregoing description that, when the sensitized film is brought into position for an exposure and the shutter opened, this fact will be indicated by the indicator plate and that until the film reel is wound to expose a new portion of the film, it will not be possible to operate the shutter a second time.

It is not intended by failing to mention equivalent structures for the details of construction to exclude the claims that follow from a broad and reasonable construction as deduced from the plain meaning of the words employed.

Having thus described my invention, what I claim as new and desire to secure by Letters Patent, is:—

1. In a camera, the combination with the case provided with means for holding and changing the sensitized material and with shutter mechanism, of means for locking the shutter mechanism from repeated operation, means for unlocking said locking means, and means intermediate the sensitized material holding and changing devices and the shutter locking device, whereby the actuation of the sensitized material changing device will unlock the shutter mechanism with means for augmenting the tension of said intermediate mechanism to insure uniform and effective unlocking.

2. In a camera, the combination with the case provided with means for holding and changing the sensitized material and with shutter mechanism, of means for locking the shutter mechanism from repeated operation, means for unlocking said locking means and a flexible torsional shaft intermediate the unlocking means and the film holding and changing means, with means for increasing the tension of the flexible shaft to insure effective action.

3. In a shutter locking and indicating device for cameras, in combination with a film winding reel and a shutter housing with shutter mechanism therein, of a casing mounted thereon, a plate slidable in the casing carrying a pin projecting into the pathway of the shutter mechanism, a latch for engaging said plate projecting into the pathway of the shutter operating device when the plate is engaged, and means for releasing said latch comprising a rotatable member and connection therefor with the film winding mechanism, and means for augmenting the tension of said reel connecting device to insure effective action.

4. In a shutter locking and indicating device for cameras, in combination with a film winding reel and a shutter housing with shutter mechanism therein, of a casing mounted thereon, a plate slidable in the casing carrying a pin projecting into the pathway of the shutter mechanism, a latch for engaging said plate projecting into the pathway of the shutter operating device when the plate is engaged, and means for releasing said latch comprising a rotatable member, an arm on said member with a lever engaging said latch extending into the pathway of said arm, a spring rod on the casing also projecting into the pathway of said arm, and a flexible, torsional connection for the rotatable member with the film winding mechanism for retarding the rotation of the rotating member to increase the tension thereof.

5. In a shutter locking and indicating device, the combination with the shutter mechanism and a housing for enclosing same, of a casing mounted in the shutter housing, a plate slidable in the casing carrying a pin projecting into the pathway of the shutter mechanism within the housing, a latch pivoted in the casing to engage the plate when lifted by the shutter mechanism, said latch when engaging the plate also projecting into the pathway of the shutter mechanism, a lever engaging said latch and projecting from the casing and a torsional spring operated rotatable member carrying an arm to engage said lever to release the latch, with a retarding member to increase the torsional tension for releasing the latch.

JAMES G. KALANZIS.